United States Patent Office 2,916,815
Patented Dec. 15, 1959

2,916,815

METHOD OF WELDING OR BRAZING ALUMINUM

Teunis Donkervoort, Noordwijk a. Zee, Netherlands, assignor to Vennootschap onder Firma Exploitatie-Onderneming van Octrooirechten Noortich, Noordwijk, Netherlands, a partnership of Netherlands No Drawing. Application July 2, 1957
Serial No. 669,436

2 Claims. (Cl. 29—504)

Until now the brazing or welding of aluminum or aluminum alloys to a metal containing or not containing aluminum, such as copper, iron or steel, has always entailed great difficulties.

The silver solder conventionally used for brazing or welding is suitable for joining all kinds of ferrous and non-ferrous metals, but not for joining aluminum (Welding J. 1952, page 649), while the brazing solder conventionally used for joining aluminum, namely an aluminum alloy containing from 4–13% of silicon, gives rise to difficulties when joining copper or iron.

In Welding J. 1954, page 867 the brazing of aluminum to copper is described. For this purpose the copper is first covered with a layer of silver or silver solder and subsequently the joint with an aluminum silicon solder is effected with the help of a flux.

Brazing solder compositions composed of aluminum, silver and silicon are described in Swiss patent 259,880, in which patent a solder for aluminum is proposed which contains 5–30% of silver and 70–95% of aluminum and which furthermore may contain silicon.

Now this invention relates to the brazing or welding of aluminum or an aluminum alloy to metals or alloys containing or not containing aluminum, such as iron or copper, without the usual means for preventing the formation of an oxide film, such as a flux or an inert shielding gas, being required.

At the same time the invention relates to the preparation of a brazing solder or welding material by means of which the above mentioned metals can be joined without the use of a flux or an inert shielding gas.

The invention is characterized by the use of a brazing solder or welding material containing 76.2 to 85% by weight of aluminum, 19–12% by weight of silver and 4.8–3% by weight of silicon.

For introducing silicon it is advantageous to start from silumin which is an alloy consisting of 10–14% of silicon and 90–86% of aluminum.

It is also possible to introduce silicon as such or as silumin and silicon. If silicon is started from, the fusion of the mixture is more difficult while a brittler alloy tends to form.

A good composition can be obtained by mixing together 1125 grams of aluminum, 250 grams of silver and 55 grams of silicon, whereby a brazing solder or welding material containing 78.7% of aluminum, 17.5% of silver and 3.8% of silicon is obtained.

By means of the above composition it is possible without any difficulty to braze or weld metals containing or not containing aluminum to aluminum, for which only a welding torch is necessary.

For this purpose the composition may be given the shape of a rod.

It is possible to influence the properties of the brazing solder or welding material by modifying the ratio of the component substances. Thus the hardness as well as the brittleness increase according as the percentage of silicon is increased.

I claim:

1. A method of brazing or welding a member of the group consisting of aluminum and aluminum alloys to alloys of copper, iron, steel and the like without the use of flux and without the use of an inert shielding gas which comprises effecting said brazing or welding with a material consisting essentially of 76.2–85% by weight of aluminum, 12–19% by weight of silver and 3–4.8% by weight of silicon.

2. A method of brazing or welding a member of the group consisting of aluminum and aluminum alloys to alloys of copper, iron, steel and the like without the use of flux and without the use of an inert shielding gas which comprises effecting said brazing or welding with a material consisting essentially of 78.7% by weight of aluminum, 17.5% by weight of silver and 3.8% by weight of silicon.

References Cited in the file of this patent

UNITED STATES PATENTS

| | | |
|---|---|---|
| 2,659,138 | Stroup | Nov. 17, 1953 |
| 2,761,047 | Meredith | Aug. 28, 1956 |